United States Patent
Mueller et al.

(10) Patent No.: US 8,325,742 B2
(45) Date of Patent: Dec. 4, 2012

(54) NETWORK BRIDGE AND A METHOD OF OPERATING THEREOF

(75) Inventors: Torsten Mueller, Kichberg an der Murr (DE); Herbert Leuwer, Backnang (DE); Thorsten Kaiser, Backnang (DE); Thomas Alberty, Backnang (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 90 days.

(21) Appl. No.: 12/527,695

(22) PCT Filed: Feb. 28, 2007

(86) PCT No.: PCT/EP2007/051914
§ 371 (c)(1),
(2), (4) Date: Jul. 29, 2010

(87) PCT Pub. No.: WO2008/104227
PCT Pub. Date: Sep. 4, 2008

(65) Prior Publication Data
US 2011/0044346 A1    Feb. 24, 2011

(51) Int. Cl.
*H04L 12/28* (2006.01)
(52) U.S. Cl. .......... 370/401; 710/316; 379/242
(58) Field of Classification Search .......... 370/401, 370/349; 455/522, 562.1
See application file for complete search history.

(56) References Cited

U.S. PATENT DOCUMENTS

2003/0125066 A1* 7/2003 Habetha .......... 455/522
2006/0019709 A1* 1/2006 Kim et al. .......... 455/562.1
2007/0280192 A1* 12/2007 Yagyu et al. .......... 370/349

FOREIGN PATENT DOCUMENTS

EP        1 566 929 A1    8/2005
WO        2005/125109 A2  12/2005

OTHER PUBLICATIONS

PCT International Search Report, mailed Sep. 2, 2008, in connection with International Application No. PCT/EP2007/051914.
PCT Written Opinion, mailed Sep. 2, 2008, in connection with International Application No. PCT/EP2007/051914.
IEEE Standard 802.1Q, IEEE Standards for Local and Metropolitan Area Networks, Virtual Bridged Local Area Networks, IEEE Computer Society, 2003 Edition.
IEEE Standard 802.1D, IEEE Standard for Local and Metropolitan Area Networks, Media Access Control (MAC) Bridges, IEEE Computer Society, Jun. 9, 2004.

* cited by examiner

*Primary Examiner* — Dang T Ton
*Assistant Examiner* — Lionel Preval
(74) *Attorney, Agent, or Firm* — Potomac Patent Group PLLC

(57) ABSTRACT

A network bridge comprising two ports for connection to two networks, a spanning tree controller and a wireless bridge link controller for each port. The ports employ an adaptive modulation technique. The wireless bridge link controller is connected to the port to exchange physical layer information with said port. When the port detects a change of its PHY mode, it sets the path cost of the link to a value configured for the new PHY mode and forces the bridge to recalculate its spanning tree. The wireless bridge link controller is also connected to the spanning tree controller. If the bridge detects that it has not received BPDUs for a certain time period and the timer will expire soon, the bridge forces the port, via the wireless bridge link controller, to use a more robust PHY mode.

15 Claims, 1 Drawing Sheet

NETWORK BRIDGE AND A METHOD OF OPERATING THEREOF

FIELD OF THE INVENTION

The present invention relates to network bridges, in general, and in particular to bridges providing wireless connection employing adaptive modulation.

BACKGROUND OF THE INVENTION

The IEEE standard IEEE 802.1D defines transparent bridges which use spanning tree protocol (STP) or rapid spanning tree protocol (RSTP) to avoid loops by limiting the usable topology of a physical topology to a mathematical spanning tree. The spanning tree protocol determines a root node and establishes a spanning tree which is optimal with regards to path cost to the root node. A path cost is a configurable numerical parameter given to a bridge port. The path cost, in most cases, is based on a guideline given in various versions of IEEE802.1D and IEEE802.1Q standards. The path cost can be administratively set per port. Another parameter of a path is a root path cost. The root path cost is a value that bridges exchange using Bridge Protocol Data Units (BPDU). In general, each bridge uses the root path cost on each port to determine how far the root bridge is away on this port. The following steps are carried out in order to establish the root path cost. Each bridge sends out its own root path cost. The root starts with 0. Furthermore, each bridge chooses the port with the lowest received root path cost as the root port. The root port calculates its own root path cost by adding the path cost of the port where it received the BPDUs to the received root path cost. Then this bridge sends BPDUs with its own root path cost. Furthermore, this standard defines default values for various Ethernet link speeds. Multiple spanning tree protocol (MSTP) that is defined in IEEE802.1Q standard is an enhancement to RSTP, which provides multiple instances of the spanning tree on the same physical topology. STP, RSTP, and MSTP rely on the exchange of messages called Bridge Protocol Data Units (BPDU) to form the spanning trees and to change the spanning trees when necessary. Bridges are either interconnected using wired links or wireless links.

In contrast to wire-line links, wireless links are faced with a time varying transmission path; i.e., under good propagation conditions a high data rate may be transmitted, while under bad propagation conditions only a lower data rate may be transmitted. Solutions known in the art use a fixed data rate adapted to the desired availability of the link. It is worth to note that propagation conditions are good most of the time. However, the requirement of availability close to 100% leads to a choice of a very robust modulation and coding scheme. In this robust modulation and coding scheme the availability requirement of the link is satisfied, but at the cost of reduced data speed of the link. Therefore, the achievable data rate is small compared to what could have been achieved most of the time.

Nowadays, wireless links may employ adaptive modulation techniques. Adaptive modulation, used in digital wireless communications systems, allows the transmitter to adapt its transmission mode in accordance with the condition of the channel. Both directions of a wireless link are independent. The receiver measures the quality of the link (by signal to noise ratio, SNR). If the receiver detects that the SNR has a value which is either too bad or too good for the current PHY mode (i.e. modulation scheme and the coding scheme used on that channel), it sends a message to the sender and requests the sender to change the PHY mode. Depending on propagation conditions of the channel the transmitter may change the modulation scheme and the coding scheme used on that channel. Different order modulations allow sending more bits per symbol and thus achieve higher throughputs or better spectral efficiencies. With the increase of the range, modulations of lower order must be used and conversely with the distance between the transmitter and the receiver getting shorter, higher order modulations for increased throughput can be used. In addition, adaptive modulation allows the system to overcome fading and other interference. The adaptive modulation of a link allows for dynamically switching between various PHY modes. A PHY mode consists of a modulation scheme and a coding scheme and determines the speed of the link as well as its robustness. This allows the maintenance of the desired availability of the link (e.g. 99.99% of time) with the most robust PHY mode, while providing a higher data rate otherwise (e.g. 99.9% of the time).

However a disadvantage of this solution is that when adaptive modulation changes the PHY mode of a link and subsequently its data rate, the existing topology may no longer represent an optimal spanning tree with regards to the usage of available resources. This may lead to wasteful situations where a network actually carries less traffic than it theoretically could do.

When adaptive modulation uses a less robust modulation scheme, errors may corrupt data frames and subsequently BPDUs. If a bridge port is in state "discarding" and in port role "AlternatePort" or "BackupPort" as specified in IEEE 802.1D for at least one spanning tree instance and if this port does not receive BPDUs from a neighbour bridge for a specific period of time the bridge may conclude that this port is connected only to end systems. Subsequently, it may set the port state to "forwarding" causing a loop which leads to catastrophic behaviour. In other cases a bridge might reconfigure the spanning tree to a less optimum topology.

Hence, an improved network bridge and a method of its operation would be advantageous and in particular one that supports dynamic changes of the topology when adaptive modulation changes the PHY mode.

SUMMARY OF THE INVENTION

Accordingly, the invention seeks to preferably mitigate, alleviate or eliminate one or more of the disadvantages mentioned above singly or in any combination.

According to a first aspect of the present invention there is provided a network bridge comprising at least two ports for connection to at least two networks, a spanning tree controller and a first wireless bridge link controller of a first port. The first port is operable to employ an adaptive modulation technique on a first wireless link. Said first wireless bridge link controller is connected to the first port to exchange physical layer information with said first port and also connected to said spanning tree controller and adapted to request change of PHY mode or to transmit new path cost with request for recalculation of a spanning tree for the first port.

Preferably the wireless bridge link controller is adapted to detect change of PHY mode on said wireless link to a new PHY mode and in response to that to modify the path cost of the wireless link affected by the change. The new path cost is a value predefined or automatically calculated for the new PHY mode. The spanning tree controller is adapted to recalculate the spanning tree associated with the port affected by the change.

Also preferably, the bridge is adapted to detect that no Bridge Protocol Data Unit (BPDU) has been received for a predefined time period and to request the wireless bridge link controller to change a current PHY mode on said wireless link to a more robust PHY mode.

When the network bridge is adapted to provide a second wireless link with adaptive modulation on its second port, the bridge includes a second wireless bridge link controller of the second port, wherein said second wireless bridge link controller is connected to the second port to exchange physical layer information with said second port. The second wireless bridge link controller is also connected to the spanning tree controller and adapted to request change of PHY mode or to transmit new path cost with request for re-calculation of a spanning tree for the second port.

According to a second aspect of the present invention there is provided a method of operating a telecommunications network comprising at least two network bridges and at least one wireless link and employing on said at least one wireless link an adaptive modulation technique. The method comprises detecting change of PHY mode on said wireless link to a new PHY mode and modifying a path cost of the wireless link affected by the change. In the next step the spanning tree associated with the port of the network bridge employing the adaptive modulation is recalculated.

According to a third aspect of the present invention there is provided a method of operating a telecommunications network comprising at least two network bridges and at least one wireless link and employing on said at least one wireless link an adaptive modulation technique. The method comprises detecting that the bridge has not received Bridge Protocol Data Unit for a predefined time period and changing a current PHY mode on said wireless link to a more robust PHY mode. Preferably this procedure is applied subsequently until either a BPDU is received or the most robust PHY mode is used.

Further features of the present invention are as claimed in the dependent claims.

The present invention beneficially allows for efficient use of the capacity available in the network, which employs wireless links with adaptive modulation taking the current link speed into account. In situations where network capacity is divided between guaranteed capacity and best effort capacity and where guaranteed capacity uses the whole capacity of the most robust PHY mode, the invention ensures usability of best effort services. The invention also helps preventing loops in the bridged network even if the wireless link provides currently a bad quality leading to corruption of BPDUs. What is also important, a bridge according to the present invention can work in a network with standard IEEE bridges.

BRIEF DESCRIPTION OF THE DRAWINGS

The present invention will be understood and appreciated more fully from the following detailed description taken in conjunction with the drawings in which.

DESCRIPTION OF EMBODIMENTS OF THE INVENTION

The present invention is discussed herein below in the context of a network bridges and their operation as defined in IEEE 802.1D standard. However, it should be understood that it is not limited to IEEE 802.1D standard, but applies to operation of network bridges providing wireless links and employing adaptive modulation on said wireless links.

Figure 1:
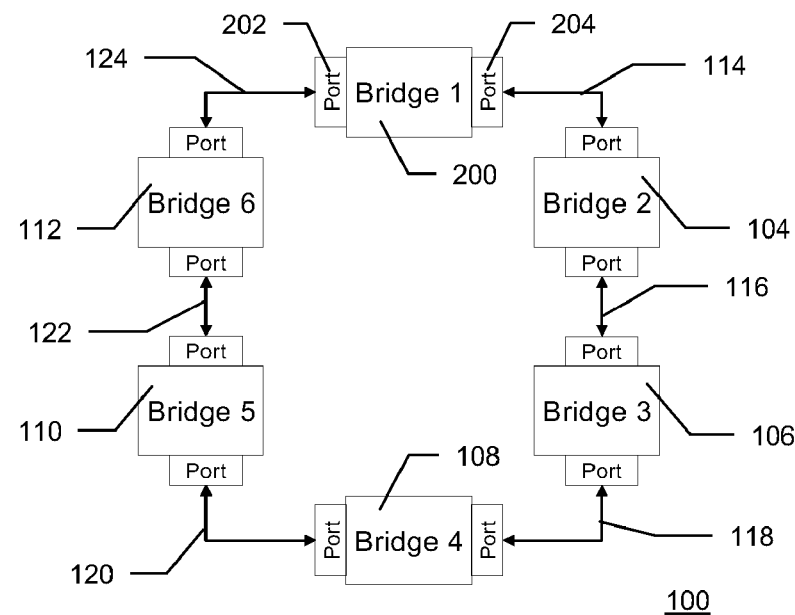
FIG. 1 is a diagram illustrating a network comprising network bridges interconnected by links.

With reference to FIG. 1 a network 100 of bridges 200, 104-112 interconnected by links 114-124 is presented. In the most general case the links 114-124 can be realised in any possible physical medium, a copper cable, optical fibre or radio (wireless). The present invention is focused on wireless links with implemented adaptive modulation. For the sake of clarity and brevity the drawings present the invention in a very schematic way with elements and lines not essential for understanding the invention omitted. Let assume that the first bridge 200 and the second bridge 104 are realized in accordance with the present invention and the link 114 connecting them is a wireless link and that the bridges 200 and 104 employ adaptive modulation on said link 114.

Bridges 200, 104-112 exchange BPDUs to communicate with each other and this allows each bridge to have enough topology information to reduce the active network topology to a mathematical spanning tree. The wireless link 114 employs adaptive modulation. Adaptive modulation may dynamically change the PHY mode (set of modulation scheme and coding used on the physical layer of the OSI model of the link 114 between bridges 200 and 104). The PHY mode determines the data rate of the link and its robustness.

Figure 2:
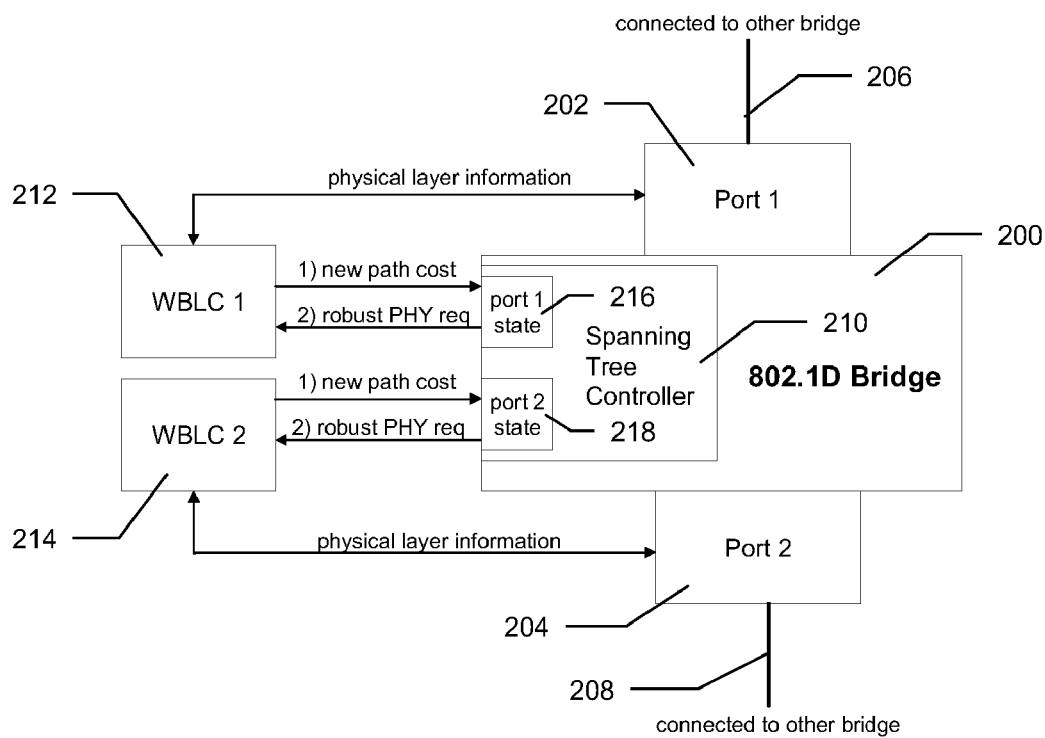
FIG. 2 is a diagram illustrating a network bridge in one embodiment of the present invention.

With reference to FIG. 2 an embodiment of a network bridge 200 in accordance with one embodiment of the present invention is presented. The bridge 200 comprising two ports 202 and 204 for connection to two networks using wireless links 206 and 208 and a spanning tree controller 210. The first port 202 and the second port 204, which in the present invention employ adaptive modulation are enhanced by respectively a first 212 and a second 214 wireless bridge-link controllers (WBLC). The WBLC 212, 214 stores the path cost for each PHY mode to be used on its associated port. Those path cost may be manually configured or automatically calculated. The WBLC 212, 214 can set a new path cost for its port in the Spanning Tree controller (STC) 210 and request the STC 210 to re-compute the spanning tree. The first wireless bridge link controller 212 is connected to the first port 202 to exchange physical layer information with said first port 202 and accordingly the second wireless bridge link controller 214 is connected to the second port 204 to exchange physical layer information with said second port 204. Both WBLCs 212 and 214 are connected to said spanning tree controller 210. The connections between the WBLCs 212, 214 and the STC are used to transmit requests from the bridge 200 to the WBLCs 212 to change PHY mode of the wireless links 206, 208 or to transmit from the WBLCs 212, 214 to the spanning tree controller 210 new path costs with request for recalculation of a spanning tree for the port. The WBLCs 212 and 214 can be implemented in hardware or in software and in the case of the software implementation the term connected refers to the ability of exchanging data with the element the WBLC is connected to.

In operation if the WBLC 212 detects that its wireless port 202 has changed the PHY mode, the WBLC 212 determines the new path cost for the port 202 and sends it to the spanning tree controller 210 requesting computation of the new spanning tree topology for that affected port.

The spanning tree controller 210 of the bridge 200 comprises a first register 216 and a second register 218 for, respectively, storing information on the state of the first port 202 and the second port 204. This information is used in the process of calculation of the new spanning tree after change of the PHY mode of the wireless link 206, 208.

The network bridge 200 is adapted to detect that no Bridge Protocol Data Unit has been received for a predefined time period. When the predefined time period expires the bridge requests the wireless bridge link controller 212, 214 to change a current PHY mode on said wireless link 206, 208 to a more robust PHY mode ("Robust PHY mode" arrows in FIG. 2). This feature can be described as a "robust bridge configuration". This configuration option means that the bridge 200 expects a single neighbour bridge 104 to be connected to the port 204 and that the system shall try to avoid loosing connectivity to that neighbour bridge 104.

If a bridge port is in port role "root", "alternate", or "backup", it expects to periodically receive BPDUs from its neighbour. In solutions known in the art if it does not receive BPDUs for a certain amount of time, a first timer will expire and the bridge will assume the neighbour has disappeared from the segment. Subsequently, the bridge will discard the associated information on that port. One possible cause for a bridge not receiving BPDUs from its neighbours might be an erroneous wireless link.

In accordance with one embodiment of the present invention, if a bridge port 202 is in robust mode and if the port role is "root" or "alternate" or "backup" and if the bridge 200 detects that it has not received BPDUs for a certain period, it shall request the WBLC to use a more robust modulation scheme.

The timing of sending the request to the WBLC 212, 214 must be set in a way that the request is sent before the first timer expires. This can be achieved on several ways. In one embodiment there is a second timer that is set to expire before expiration of the first timer and it is expiration of the second timer that triggers sending to the WBLC 212 or 214 the request for more robust PHY mode. In an alternative embodiment it is possible to use the first timer that expires regularly and a counter. In this embodiment the bridge 200 use a 2 seconds timer. If the bridge 200 does not detect BPDUs from its neighbour on a port for 3 consecutive periods of 2 seconds, it will discard all priority vector information on that port and recalculate the spanning tree. In this situation the bridge is configured to send to the WBLC 212 or 214 the request for more robust PHY mode after 2 consecutive periods of 2 seconds. This will ensure that a new, more robust PHY mode is applied before connection on that port is discarded.

This procedure may be applied subsequently until either the BPDU is received or the most robust PHY mode is used. If the most robust PHY mode is used and if the bridge still does not receive BPDUs from its neighbour on the port, the procedure was not successful and the bridge shall discard the information on this port.

It is within contemplation of the present invention that the solution is applicable to network bridges having the number of wireless ports with adaptive modulation different than two. In one embodiment it may be a network bridge having one wireless port and one wired port. Moreover according to the present invention the bridge can comprise significantly large number of ports and in some embodiments part of those ports can be wireless ports employing adaptive modulation with connected WBLCs.

Preferably, switching back to less robust schemes is allowed after a wait to restore time to avoid flapping between different PHY modes. Wait to restore is a concept which is used in telecommunication after a failure has been repaired. After a failure, the system will switch from the working to the redundant entity. Typically, this is done fast to shorten interruption time (but please note, there is always an interruption). If the failed resource has been repaired, it is not a good idea to switch back to the main entity immediately. The reason is that if the main resource is flapping between good and bad, communication becomes impossible due to the interruption explained above. Therefore, the "wait to restore" time is applied which is typically in the order of minutes. The main resource must be in state "good" for the wait to restore time before the system switches back to the main resource.

In one embodiment, in situations where network capacity is divided between guaranteed capacity and best effort capacity and where guaranteed capacity uses the whole capacity of the most robust PHY mode, the invention ensures usability of best effort services. In this embodiment we need multiple instances of spanning tree (so we need e.g. to use MSTP described in 802.1Q). Then it is necessary to map guaranteed service and best effort service to different spanning tree instances.

The invention claimed is:

1. A network bridge comprising at least two ports for connection to at least two networks, a spanning tree controller and a first wireless bridge link controller of a first port, wherein the first port is operable to employ an adaptive modulation technique on a first wireless link, wherein said first wireless bridge link controller is connected to the first port to exchange physical layer information with said first port and configured to detect change of PHY mode on a wireless link to a new PHY mode and to said spanning tree controller to request change of PHY mode or to transmit new path cost with request for re-calculation of a spanning tree for the first port.

2. The network bridge according to claim 1 further comprising a second wireless bridge link controller of a second port, wherein the second port is operable to employ an adaptive modulation technique on a second wireless link, wherein said second wireless bridge link controller is connected to the second port to exchange physical layer information with said second port and to said spanning tree controller to request change of PHY mode or to transmit new path cost with request for re-calculation of a spanning tree for the second port.

3. The network bridge according to claim 1, wherein the spanning tree controller comprises a first register for storing information on a state of the first port.

4. The network bridge according to claim 2, wherein the spanning tree controller comprises a first register for storing information on a state of the first port and a second register for storing information on a state of the second port.

5. The network bridge according to claim 1, wherein in response to detection of change of PHY mode on the wireless link to the new PHY mode, the first wireless bridge link controller is configured to modify the path cost of the wireless link affected by the change to a new value for the new PHY mode and the spanning tree controller is configured to recalculate the spanning tree associated with the port affected by the change.

6. The network bridge according to claim 1 configured to detect that no Bridge Protocol Data Unit has been received for a predefined time period and to request the wireless bridge link controller to change a current PHY mode on said wireless link to a more robust PHY mode.

7. The network bridge according to claim 1, wherein said wireless bridge link controller is configured to store path cost data for PHY modes to be used on their relevant ports.

8. The network bridge according to claim 1, wherein said wireless bridge link controller is configured to automatically calculate path cost data for PHY modes to be used on their relevant ports.

9. The network bridge according to claim 1, comprising plurality of wireless ports employing adaptive modulation and a plurality of wireless bridge link controllers connected to said wireless ports.

10. A method of operating a telecommunications network comprising at least two network bridges and at least one wireless link, and employing on said at least one wireless link an adaptive modulation technique, comprising:

in a first wireless bridge link controller, exchanging physical layer information with a first port of a first network bridge and detecting change of PHY mode on said wireless link to a new PHY mode;

modifying by the first wireless bridge controller a path cost of the wireless link affected by the change and requesting from a spanning tree controller change of PHY mode or transmitting to the spanning tree controller new path cost with a request for re-calculation of a spanning tree; and recalculating by the spanning tree controller a spanning tree associated with a port of the bridge employing the adaptive modulation.

11. The method according to claim 10, wherein the path cost of the wireless link is changed to a new value for the new PHY mode.

12. The method of claim 10, further comprising:

detecting that a network bridge has not received Bridge Protocol Data Unit for a predefined time period; and changing a current PHY mode on said wireless link to a more robust PHY mode.

13. The method according to claim 12, wherein the step of changing a current PHY mode to a more robust one is repeated until Bridge Protocol Data Unit is received within the predefined time period or the most robust PHY mode available for the network bridge is used.

14. The method according to claim 13, comprising discarding information on said port if no Bridge Protocol Data Unit is received within the predefined time for the most robust PHY mode.

15. The method according to claim 12, wherein switching back to less robust PHY mode is allowed after a wait to restore time.

* * * * *